United States Patent [19]

Bjorklund et al.

[11] 3,999,839

[45] Dec. 28, 1976

[54] OPTICAL PULSE COMPRESSORS EMPLOYING MODULATIONS AFFECTING THE TWO-PHOTON DISPERSION OF AN ATOMIC GASEOUS MEDIUM

[75] Inventors: Gary Carl Bjorklund, West Windsor; Paul Foo-Hung Liao, Middletown, both of N.J.

[73] Assignee: Bell Telephone Laboratories, Incorporated, Murray Hill, N.J.

[22] Filed: Jan. 8, 1976

[21] Appl. No.: 647,435

[52] U.S. Cl. .......... 350/160 R

[51] Int. Cl.² .......... G02F 1/16

[58] Field of Search .......... 331/94.5; 350/160, 161; 356/112; 307/88.3

[56] References Cited

UNITED STATES PATENTS

| | | | |
|---|---|---|---|
| 3,459,466 | 8/1969 | Giordmaine | 350/160 |
| 3,483,387 | 12/1969 | Davis, Jr. | 350/160 |
| 3,551,034 | 12/1970 | Tournois et al. | 350/160 |
| 3,657,554 | 4/1972 | Lumpkin et al. | 307/88.3 |
| 3,679,313 | 7/1972 | Rosenberg | 331/94.5 |

OTHER PUBLICATIONS

Treacy, Optical Pulse Compression with Diffraction Gratings, IEEE, J. Quant. Elect. QE-5 (Sept. 1969), pp. 454–458.

Loy, A Dispersive Modulator, Appl. Phys. Lett., vol. 26, No. 3 (Feb. 1, 1975), pp. 99–101.

Grischkowsky, Optical Pulse Compression, Appl. Phys. Lett., vol. 25, No. 10 (Nov. 15, 1974), pp. 566–568.

*Primary Examiner*—William L. Sikes
*Attorney, Agent, or Firm*—W. L. Wisner; Michael J. Urbano

[57] ABSTRACT

Two different pulse compressors for relatively intense optical beams differ from the prior art both in employing a two-photon dispersion effect and in employing a different set of modulations than is conventional for "chirped" pulse compressors. The first one depends upon turning on and then turning off a two-photon dispersion effect of an atomic gaseous medium upon a first coherent beam from which the pulse is to be formed. The effect is turned on and off by the second beam within a time period not substantially more than the length of the medium divided by the dispersive group velocity of the first beam in the medium. The dispersion in effect allows energy to be concentrated in the medium by means of a temporary delay. The second device is analogous to that of U.S. Pat. No. 3,679,313 to R. L. Rosenberg, issued July 25, 1972, in employing overlapping "comb" patterns of modulation products but differs therefrom in that it replaces the dispersive interferometer with the two-photon dispersive gas medium and employs much wider frequency modulations. The first beam is chirped, or frequency-modulated, at a first rate; but the second beam is frequency-modulated at a rate sufficiently different from that of the first beam that the modulation product combs intermesh to provide two-photon interaction over the broadest possible frequency band.

3 Claims, 2 Drawing Figures

11
SIGNAL LASER SOURCE $\nu_S$
14
15
PHASE MODULATOR
BEAMSPLITTER
18
17
PHASE MODULATOR
16
13
CONTROL LASER SOURCE $\nu_C$
19
GASEOUS MEDIUM COMPRESSOR CELL
$\nu_{G_2}$ = TWO-PHOTON ABSORPTION FREQUENCY
20
DICHROIC BEAMSPLITTER
12
APPARATUS FOR UTILIZING COMPRESSED $\nu_S$ PULSE
21
OPTIONAL APPARATUS FOR UTILIZING COMPRESSED $\nu_C$ PULSE

OPTICAL PULSE COMPRESSORS EMPLOYING MODULATIONS AFFECTING THE TWO-PHOTON DISPERSION OF AN ATOMIC GASEOUS MEDIUM

BACKGROUND OF THE INVENTION

This invention relates to optical pulse compressors.

Chirped or frequency-modulated pulse compressors have long been known in the radar-related electronic arts; and somewhat analogous optical pulse compressors employing chirped or frequency-modulated optical beams have also been known for a number of years.

Nevertheless, these optical pulse compressors suffer from various disadvantages. In some cases, to compress the chirped or frequency-modulated pulse a group velocity dispersive effect is employed which is frequently disadvantageous in requiring operation close to a resonance frequency for which suitable sources may not be available.

Other pulse compressors such as that disclosed in U.S. Pat. No. 3,679,313 to R. L. Rosenberg, issued July 25, 1972, are severely limited in the overall group delay which may be achieved and hence are limited to compressing pulses which are already short.

It is desirable to have more versatile pulses compression techniques available that can overcome the foregoing problems.

SUMMARY OF THE INVENTION

We have discovered properties of two-photon absorption transitions which have led us to recognize how to implement two improved types of optical pulse compressors freed of at least some of the problems of the prior art. Specifically, our discovery resides in part in that we have found that the dispersion associated with two-photon absorption transitions is controllable and therefore relatively tractable. We have also found that the two-photon group velocity dispersion can be very strong and that group velocities as low as one-tenth of the speed of light may be achieved. It is noted that the two-photon dispersion is found in an extended atomic gaseous medium having at least one two-photon absorption transition.

A specific feature of a first embodiment of our invention is the provision of means for turning off and on the two-photon dispersion effect for a first coherent beam by means of a second coherent beam of essentially complementary frequency within a time period not substantially longer than the length of the medium divided by the dispersive group velocity of the first beam in the medium.

A specific feature of a second embodiment of our invention is the substitution of the two-photon dispersive atomic gas medium for the dispersive interferometer of the above-cited U.S. Pat. No. 3,679,313 to R. L. Rosenberg. Because of the large group velocity dispersion available in two-photon dispersive atomic media, much larger group delays may be achieved and much longer pulses may be compressed than in the patent.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENT

Figure 1:
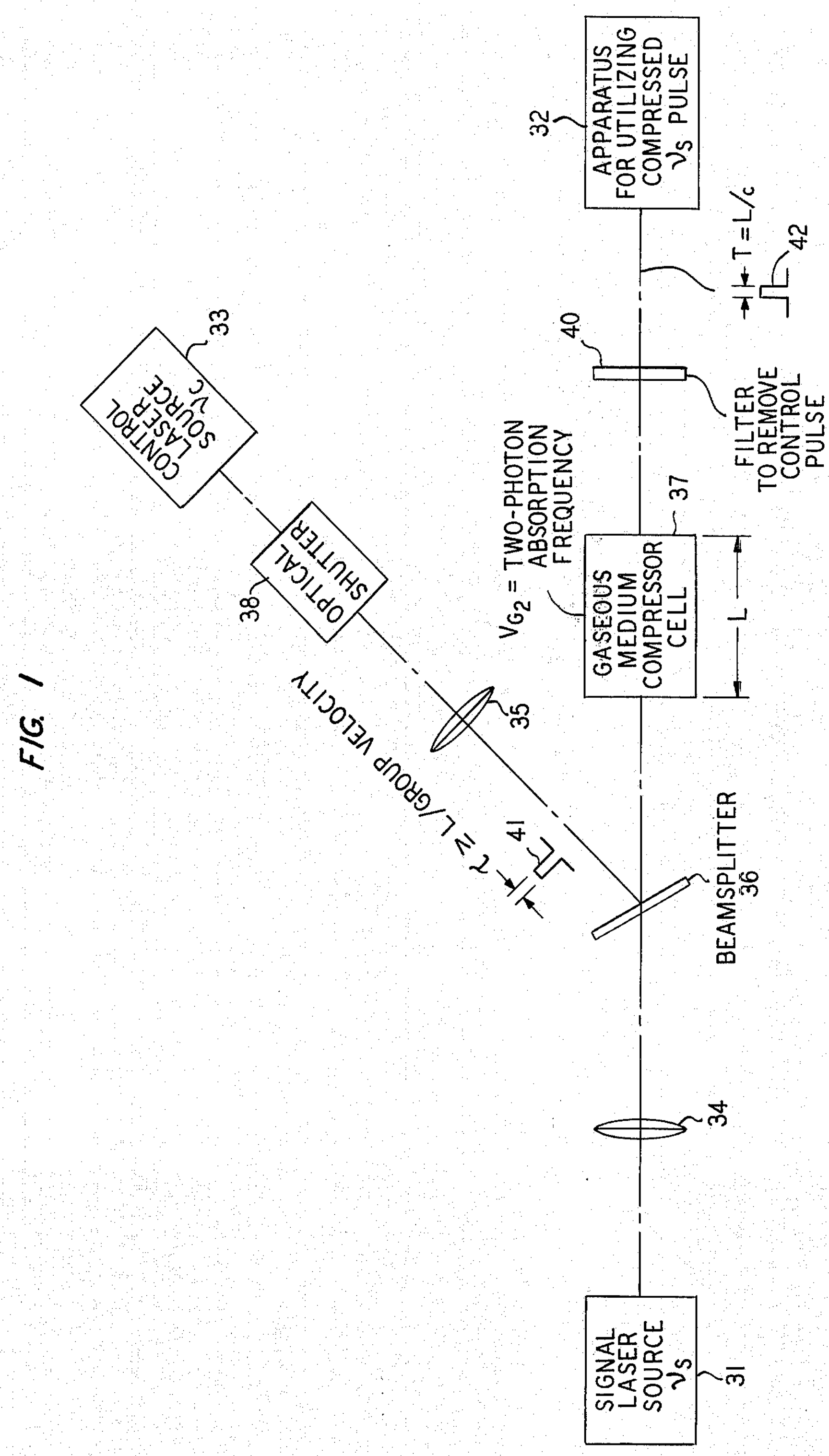
FIG. 1 is a partially pictorial and partially block diagrammatic illustration of a first embodiment of our invention.

The embodiment of FIG. 1 employes the unique property of the two-photon absorption transition in a gaseous atomic medium such as the sodium vapor in cell 37, that its dispersion can be turned on and off.

In the embodiment of FIG. 1 the beam to be compressed is derived from a signal laser source 31 and is focused toward cell 37 by lens 34 through the beam splitter 36.

The beam which is to control the two-photon dispersion is supplied from a control laser source 33 of frequency $\nu_c$. The sum of $\nu_c$ and $\nu_s$, the frequency of source 31, is offset from the two-photon absorption frequency $\Omega$ by an amount just sufficient at their combined power levels to insure substantial two-photon group delay when both beams are on. The intensity of the control laser is chosen to be substantially greater than that of the signal laser. The beam from source 33 is focused toward medium 37 by lens 35, through the optical shutter 38, which controls the pulse width of the beam from source 33, and thence by reflection from beam splitter 36.

It is seen that the two beams pass through gaseous medium compressor cell 37 collinearly, when both are present. In addition, when both are present, the dispersion of the sodium vapor in cell 37, or other suitable vapor, slows the group velocity of the beam from source 31 so that the energy of that beam tends to accumulate in cell 37.

After the resulting delay, the beams pass out of cell 37 toward utilization apparatus 32. Therebetween, filter 40 removes the residual control pulse before utilization apparatus 32. Only the compressed signal pulse is desired to arrive at apparatus 32.

In operation, the optical shutter 38, driven by means not shown, provides a pulse width of the pulse 41 which is passed on toward beam splitter 36 and cell 37, which pulse width is greater than or equal to the length L of the cell 37 divided by the group velocity of the frequency components of the signal from source 31 in the gaseous medium of cell 37.

Thus, when the pulse 41 reaches the sodium gaseous medium in cell 37 it immediately creates a two-photon dispersion in that medium because its frequency is sufficiently complementary to that of source 31. In other words, $\nu_c + \nu_s = \nu_{G_2} - \Delta\nu$, where $\nu_{G_2}$ is the two-photon absorption frequency, and $\Delta\nu$ is a selected frequency offset so that sufficient dispersion exists without producing substantial two-photon absorption. This offset is obviously also a function of the intensities of the beams from sources 31 and 33. Because of the simultaneous passages of the two beams in cell 37 creating suddenly increased dispersion and therefore decreased group velocities for the signal beams, the energy, at frequency $\nu_s$, propagating in cell 37 tends to be crowded together with optical energy arriving behind it at the relatively higher velocity that it had in the exterior medium.

That is, radiation from souce 31 arriving over the time period $\tau$ where $\tau$ is the length L of the medium in cell 37 divided by the group velocity of the light in the medium, is all compressed within the medium 37 at the time that the trailing edge of the pulse from source 33 has arrived at the input end of cell 37.

If, now, the two-photon dispersion is suddenly turned off, all of this energy will propagate out of the medium in a time which is equal to L, the length of the cell, divided by the velocity of light. The velocity of light is much higher than the group velocity of the beam from source 31 in the dispersive medium of cell 37; and the compressed signal pulse from cell 37 will have a width which has the ratio to the width of the pulse from source 31 which is in the ratio of the group velocity just described to the velocity of light. In other words, the compression ratio would be as high as 10 to 1 or even 20 to 1.

Indeed, the two-photon dispersion is turned off when pulse 41 from source 33 ends; and pulse 41 was shaped so that it would end just as cell 37 was completely filled with the compressed energy.

Therefore, the energy is rapidly dumped out of cell 37 in compressed form, as above described; the resulting pulse propagates toward utilization apparatus 32. With respect to other energy from source 31, which preceded and which may follow this pulse, this background is so much lower in amplitude than the compressed pulse that it is not considered significantly annoying. On the other hand, the residual portion of the control pulse which is also propagated out of cell 37 is typically removed by narrow band filter 40, so that it is not necessary to tolerate this additional background.

If, in spite of the relatively low level of the background at frequency $\nu_s$, it is desired to remove the background, then that can be achieved by another optical shutter like shutter 38 disposed between cell 37 and filter 40. A common driving means would then drive the two shutters in a synchronized fashion so that the added shutter would close again when the expected compressed pulse from cell 37 should have completed its passage through shutter 38. This operation would remove the background from the trailing edge of the pulse. It will be noted that there will be a natural gap in front of the leading edge of the pulse as the result of the compression process.

Figure 2:
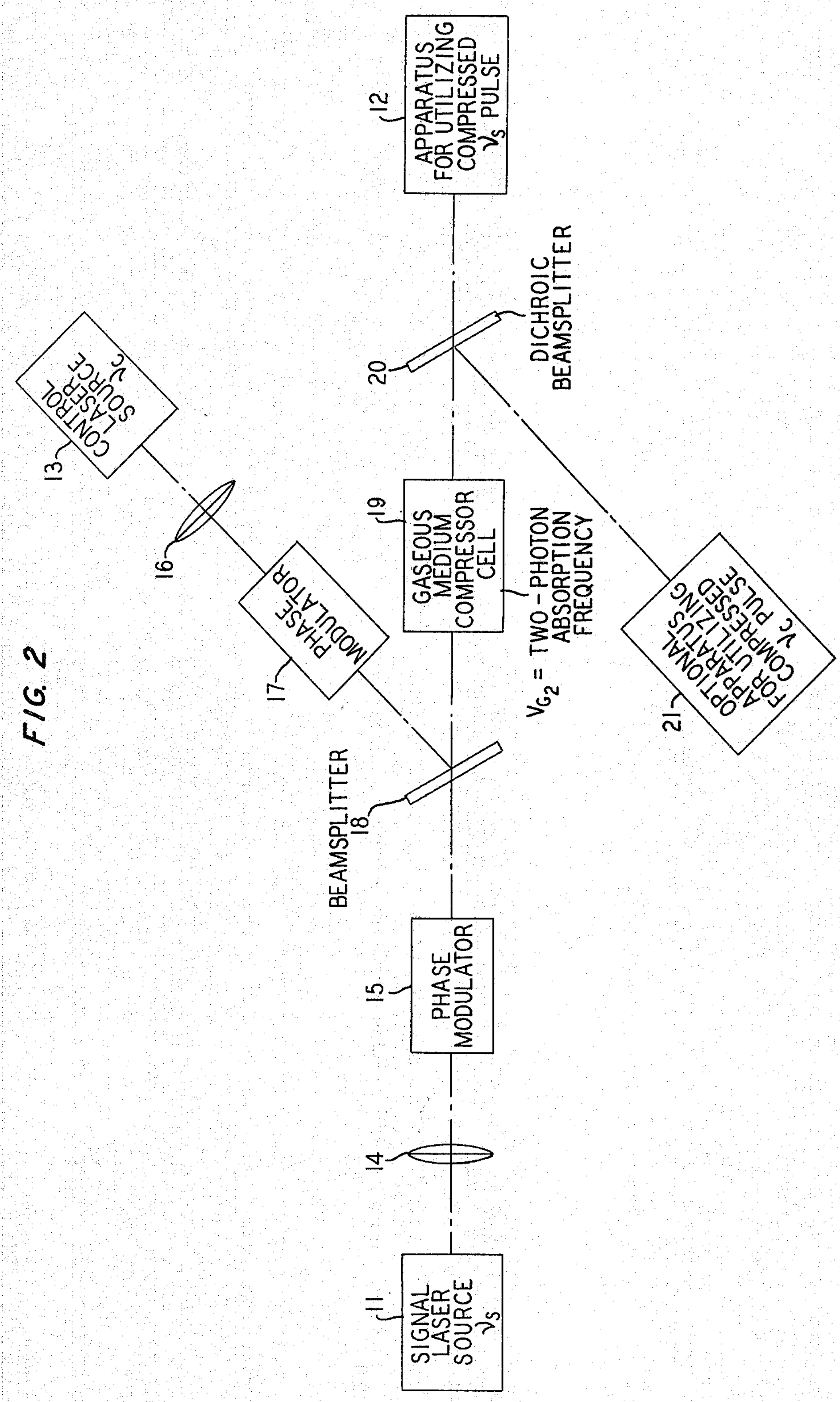
FIG. 2 is a partially pictorial and partially block diagrammatic illustration of a second embodiment of our invention.

In FIG. 2 the beam to be compressed is derived from a signal laser source 11 of frequency $\nu_s$ and is focused toward cell 19 by lens 14 through the conventional phase modulator 15, which chirps or frequency-modulates the beam at a first rate, and beam splitter 18.

The beam which is to control the two-photon dispersion is supplied from a control laser source 13 of frequency $\nu_c$. The sum of $\nu_c$ and $\nu_s$, the frequency of source 11, is offset from the two-photon absorption frequency $\Omega$ by an amount just sufficient at their combined power levels to insure substantial two-photon dispersion when both beams are on. The beam from source 13 is focused toward cell 19 by lens 16, through the conventional phase modulator 17, which chirps or frequency modulates the control beam at a second rate, and thence by reflection from beam splitter 18.

It is seen that the two beams pass through gaseous medium compressor cell 19 collinearly, when both are present. In addition, when both beams are present in cell 19, the modulation product sidebands of both beams are present in the cell 19. The two respective rates of frequency modulation in modulators 15 and 17 are chosen so that the two modulation product combs are intermeshed in frequency in cell 19; that is, alternate modulation sidebands are from the different beams respectively. Moreover, any successive three sidebands, two from one beam and one from the other, are preferably evenly spaced in frequency. By virtue of the total frequency ranges of the modulations, both combs extend substantially throughout the frequency range in which the medium of cell 19 exhibits dispersion.

After passing through cell 19, the beams pass out of cell 19 toward dichroic beam splitter 20, which passes the compressed signal pulse to utilization apparatus 12. The control pulse from source 13, which may also be compressed, is reflected from dichroic beam splitter 20. It may optionally be utilized in utilization apparatus 21.

In a manner similar to that of U.S. Pat. No. 3,679,313, cited above, the operation can be described in overall effect as follows. The two phase modulators 15 and 17, since they are driven by differing modulation frequencies to create the above-described intermeshed modulation product combs, provide a mapping of the pulse compression effect throughout the available frequency spectrum in which the atomic sodium medium 19 exhibits dispersion. In other words, the dispersive frequency spectrum is essentially fully occupied so that all the modulation products and residual initial components of the beams are mapped into the shortest possible compressed pulse at utilization apparatus 12.

Since the two initial beams are of substantially different frequencies in the typical case, for example, 0.6117 micrometers and 1.064 micrometers, and since their modulation products will be disposed about those center frequencies, the effects of the compression will be centered in two different frequency bands so that two output compressed pulses are available. The second one, which is a compressed version of the control pulse from source 13 may optionally be received at utilization apparatus 21. In our illustrative example of FIG. 2, the frequencies of the driving signals (driven by means not shown) of phase modulators 15 and 17 are respectively 1100 MHz and 1000 MHz. Thus, phase modulators 15 and 17 may illustratively use lithium tantalate electrooptic crystals operated so that the beams pass therethrough along the c-axis of the lithium tantalate.

The output compressed pulses are of sufficiently small width that they may be useful for investigating the properties of matter, for example, the properties of unknown crystals. Thus apparatus 12 can be an appropriate type of spectrometer for studying the effects of the short pulses on such crystals. Such short pulses also have uses in time-division-multiplexed optical communication systems.

In both of the preceding embodiments, it is not necessary for the two beams to be collinear. It is sufficient that they overlap wherever they are present in the medium. The total path length presented to each beam by the medium must be sufficient to provide the total group delay characteristic of the operation of the device. With large group delay, a long pulse can be compressed.

What is claimed is:

1. An optical pulse compressor comprising a source of a first coherent optical beam from which a compressed pulse is to be formed, a source of second coherent optical control beam, and an atomic gaseous medium intercepting said first beam and having a two-photon absorption near the sum of the photon energies of the beams, said second beam being applied to said medium with said first beam and having a frequency sufficient when added to the frequency of said first beam to yield a two-photon dispersion attributable to said absorption, said second beam being pulsed with a duration not more than the length of the medium divided by the group velocity of said first beam in said medium under the influence of said dispersion.

2. An optical pulse compressor comprising a source of a first coherent optical beam from which a compressed pulse is to be formed, a source of a second coherent optical control beam, and an atomic gaseous medium intercepting said first beam and having a two-photon absorption near the sum of the photon energies of the beams, said second beam being applied to said medium with said first beam and having a frequency sufficient when added to the frequency of said first beam to yield a two-photon dispersion attributable to said absorption, and respective means in the paths of said first and second beams for modulating said first and second beams at respectively different rates of change of frequency in order to intermesh their modulation products and thereby map the compression effect throughout the dispersive bandwidth of said medium.

3. An optical pulse compressor comprising a source of a first coherent optical beam from which a compressed pulse is to be formed, a source of a second coherent optical control beam, and an atomic gaseous medium intercepting said first beam and having an absorption for energy of photon energy substantially larger than the photon energy of said beam, said absorption being suitable for two-photon absorption, said second beam being applied to said medium with said first beam and having a frequency sufficient when added to the frequency of said first beam to yield a two-photon dispersion attributable to said absorption, and means for providing for said beams distinctive modulations to provide pulse compression of at least one of said beams dependent upon said dispersion.

* * * * *